(12) United States Patent
Choi

(10) Patent No.: US 6,856,327 B2
(45) Date of Patent: Feb. 15, 2005

(54) APPARATUS FOR MOVING DISPLAY SCREEN OF MOBILE COMPUTER DEVICE

(75) Inventor: Young Geun Choi, Kyoungki-do (KR)

(73) Assignee: Domotion Ltd., Sungnam-si (KR)

( * ) Notice: Subject to any disclaimer, the term of this patent is extended or adjusted under 35 U.S.C. 154(b) by 162 days.

(21) Appl. No.: 10/207,798

(22) Filed: Jul. 31, 2002

(65) Prior Publication Data

US 2004/0021674 A1 Feb. 5, 2004

(51) Int. Cl.[7] .................................................. G09G 5/00
(52) U.S. Cl. ...................................... 345/684; 345/157
(58) Field of Search ................................ 345/684, 156, 345/158, 751, 963, 752, 157, 167, 7, 8; 361/683; 341/1–9; 348/734, 77, 169, 153, 53, 159, 558, 155; 700/275, 14, 22; 340/522

(56) References Cited

U.S. PATENT DOCUMENTS

| 5,339,095 A | * | 8/1994 | Redford ....................... 345/158 |
| 5,339,104 A | * | 8/1994 | Hong .......................... 348/155 |
| 5,598,187 A | * | 1/1997 | Ide et al. ..................... 345/158 |
| 5,602,566 A | * | 2/1997 | Motosyuku et al. ........ 345/684 |
| 6,151,208 A | * | 11/2000 | Bartlett ....................... 361/683 |
| 6,246,322 B1 | * | 6/2001 | LeDain et al. .............. 340/531 |
| 6,380,882 B1 | * | 4/2002 | Hegnauer .................... 342/28 |
| 6,700,528 B2 | * | 3/2004 | Williams et al. ............. 342/28 |

* cited by examiner

Primary Examiner—Jeffery Brier
Assistant Examiner—Thu-Thao Havan
(74) Attorney, Agent, or Firm—Staas & Halsey LLP

(57) ABSTRACT

An apparatus for moving a display screen by detecting the three-dimensional motion of the mobile computer device with acceleration sensors is disclosed. The apparatus includes a position detector for detecting a three-dimensional positional change of the mobile computer device, and then producing analog signals corresponding to the motion of the mobile computer device; an analog/digital converter for converting the analog signals produced by the position detector into digital signals; and a screen controller for receiving a first display signal including all information, and producing a second display signal including a part of information according to the digital signals.

4 Claims, 4 Drawing Sheets

APPARATUS FOR MOVING DISPLAY SCREEN OF MOBILE COMPUTER DEVICE

FILED OF THE INVENTION

The present invention relates to an apparatus for moving a display screen displayed on a monitor of a mobile computer device, and more particularly to an apparatus for moving a display screen by detecting the three-dimensional motion of the mobile computer device with acceleration sensors and converting the detected signals into screen moving signals.

BACKGROUNDS OF THE INVENTION

Mobile computer devices such as a PDA (Personal Digital Assistance) and small portable telecommunication devices including a cellular phone and a PCS (Personal Communication System) have been widely used with the developments of wireless telecommunication technology and computer device technology. By storing information in the devices, information can be easily and conveniently managed, and enormous information can also be transferred to the user by the wireless internet connections.

However, the size of display screen of the mobile computer device is not large enough to display sufficient information stored in the memory of the devices or transferred from the internet connection, and only a part of information can be displayed on the monitor of the device. Therefore, users generally move the display screen by pressing the arrow keys equipped on the devices or by using a separate mouse connected to the device to see the entire information. However, it is not easy to install at least four arrow keys on the small mobile devices to move the display screen, and furthermore handling of such keys is cumbersome and not convenient for users.

SUMMARY OF THE INVENTION

Therefore, it is an object of the present invention to provide an apparatus for conveniently and easily moving a display screen displayed on a monitor of a mobile computer device.

It is other object of the present invention to provide an apparatus for moving a display screen displayed on a monitor of a mobile computer device without using arrow keys or other external devices such as mouse.

To achieve the above object, there is provided an apparatus for moving a display screen of a mobile computer device comprising: a position detector for detecting a three-dimensional positional change of the mobile computer device, and then producing analog signals corresponding to the motion of the mobile computer device; an analog/digital converter for converting the analog signals produced by the position detector into digital signals; and a screen controller for receiving a first display signal including all information, and producing a second display signal including a part of information according to the digital signals.

The present invention also provides an apparatus for moving a display screen of a mobile computer device comprising: a first acceleration sensor for detecting a side-to-side movement and slant of the mobile computer device in the side-to-side direction; a second acceleration sensor for detecting an up-to-down movement and slant of the mobile computer device in the up-to-down direction; a first A/D converter for converting analog signals produced by the first acceleration sensor into a first gravitational mode signal corresponding to the slant of the side-to-side direction of the mobile computer device and a first acceleration digital signal corresponding to the side-to-side movement of the mobile computer device, a second A/D converter 22 for converting analog signals produced by the second acceleration sensor into a second gravitational mode signal corresponding to the slant of the up-to-down direction of the mobile computer device, and a second acceleration digital signal corresponding to the up-to-down movement of the mobile computer device; a first integrator and a third integrator for producing a first window-moving mode signal by successively integrating the first acceleration digital signal; a second integrator and a fourth integrator for producing a second window-moving mode signal by successively integrating the second acceleration digital signal; and a screen controller for receiving a first display signal including all information, and producing a second display signal including a part of information according to the first and the second gravitational mode signals or the first and the second window-moving mode signals.

BRIEF DESCRIPTION OF THE DRAWINGS

A more complete appreciation of the invention, and many of the attendant advantages thereof, will be better understood by reference to the following detailed description when considered in conjunction with the accompanying drawings, wherein.

DETAILED DESCRIPTION OF THE PREFERRED EMBODIMENT

Figure 1:
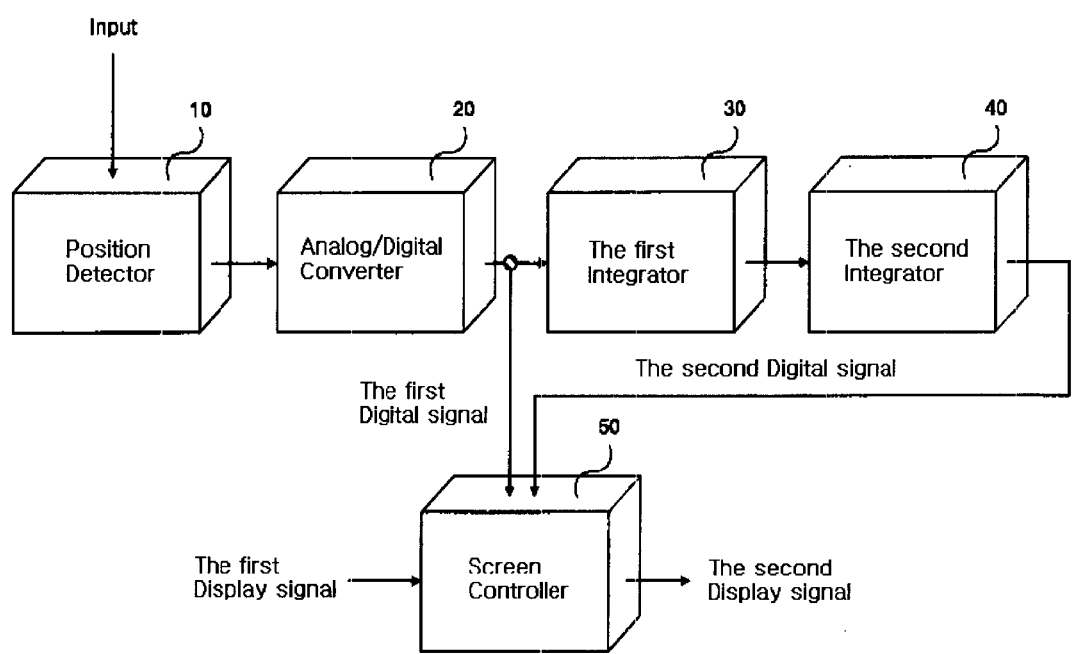
FIG. 1 is a block diagram of an apparatus for moving a display screen displayed on a monitor of a mobile computer device according to an embodiment of the present invention.

FIG. 1 is a block diagram of an apparatus for moving a display screen by detecting the three-dimensional motion of the mobile computer device according to an embodiment of the present invention. As shown in FIG. 1, the apparatus for moving a display screen according to an embodiment of the present invention comprises a position detector 10, an analog/digital (A/D) converter 20, a first integrator 30, a second integrator 40, and a screen controller 50.

The position detector 10 detects a three-dimensional positional change of the mobile computer device having a memory (not shown) storing entire information and a small display screen on which only a part of the information is displayed, and then produces analog signals corresponding to the motion of the mobile computer device. In detail, the position detector 10 detects a direction of the gravity with respect to the mobile computer device, that is, a slant of the mobile computer device and then produces the first analog signals corresponding to the slant of the mobile computer device. The position detector 10 also detects the change of the acceleration with respect to the mobile computer device, that is, the velocity change of the movement of the mobile computer device in at least two dimensions, and then produces the second analog signals corresponding to the movement of the mobile computer device. As the position detector 10, commercially available acceleration sensor, for example, Dual axis accelerometer chip (Domotion Co., Ltd, DXD 214) can be used. The acceleration sensor detects a movement acceleration value as well as a gravitational acceleration value.

The A/D converter 20 converts the first and the second analog signals produced by the position detector 10 into the first digital signals and acceleration digital signals, respectively. The acceleration digital signals produced by the A/D converter 20 are transmitted to the first and the second integrator 30, 40. The integrators 30, 40 successively integrate the acceleration digital signals corresponding to the velocity changes of the movement of the mobile computer device at each direction to produce the second digital signals. The output from the first integrator 30 corresponds to the velocity of the device, and the output from the second integrator 40 corresponds to the moved distance (displacement) of the device. In summary, the first digital signal corresponds to the slant of the mobile computer device at each direction, and the second digital signal corresponds to the moved distance of the mobile computer device at each direction.

The first and the second digital signals are transmitted to the screen controller 50. The screen controller 50 receives a first display signal including all information (i.e., full screen), and produces a second display signal including a part of information (i.e., a part of screen) according to the first or the second digital signals. Therefore, a part of the screen to be displayed is determined from the full screen according to the slant or the moved distance of the mobile computer device.

User can select the mode to move the display screen. If he chooses a gravity mode, the screen can be moved according to the first digital signals, i.e., the slant of the mobile computer device. For example, if there is a small slant in the x-direction (side-to-side direction and horizontal direction of the monitor) by the movement of the mobile computer device, a part of the screen, which is near apart from the center of the full screen in the x-direction, is displayed on the monitor. On the contrary, if there is a large slant in the x-direction, a part of the screen, which is far apart from the center of the full screen, is displayed on the monitor.

If he chooses a window-moving mode, the screen can be moved according to the second digital signals, i.e., the moved distance of the mobile computer device. For example, if there is a small movement of the device in the x-direction, a part of the screen, which is near apart from the center of the full screen, is displayed on the monitor. On the contrary, if there is a large movement of the device in the x-direction, a part of the screen, which is far apart from the center of the full screen in the x-direction, is displayed on the monitor. In this mode, the display screen moves according to the moved distance of the mobile device.

Figure 2:
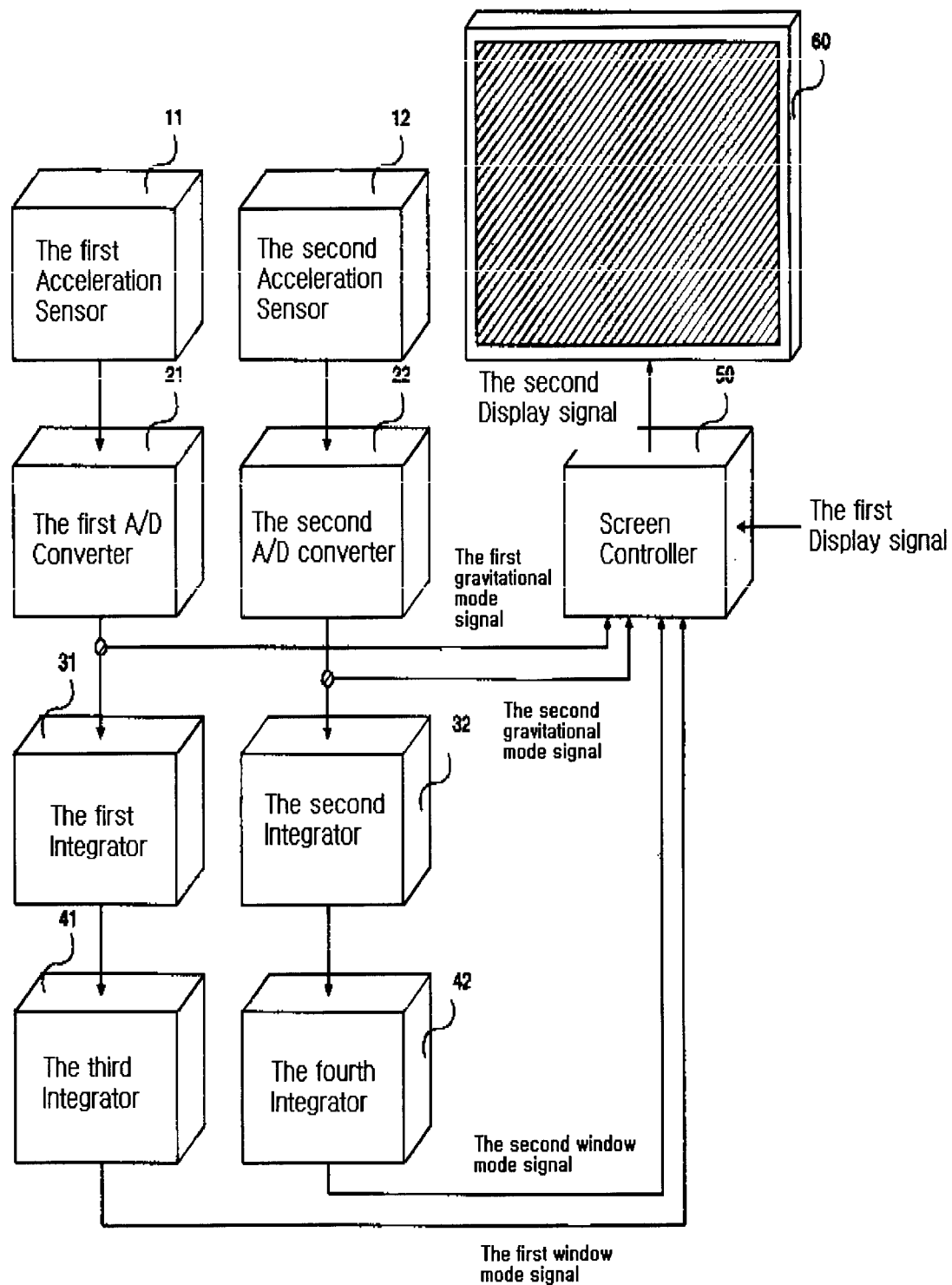
FIG. 2 is a block diagram of an apparatus for moving a display screen displayed on a monitor of a mobile computer device according to other embodiment of the present invention.

FIG. 2 shows a block diagram of an apparatus for moving a display screen displayed on a monitor of a mobile computer device according to other embodiment of the present invention. The apparatus shown in FIG. 2 includes a first acceleration sensor 11 for detecting a side-to-side (x-direction) movement of the mobile computer device, a second acceleration sensor 12 for detecting an up-to-down (y-direction) movement of the mobile computer device, a first A/D converter 21 and a second A/D converter 22 each connected to the first acceleration sensor 11 and the second acceleration sensor 12, respectively, a first integrator 31 and a third integrator 41 connected successively to the first A/D converter 21 and a second integrator 32 and the fourth integrator 42 connected successively to the second A/D converter 22.

The first acceleration sensor 11 and the second acceleration sensor 12 detect the slant of the side-to-side direction and the slant of the up-to-down direction of the mobile computer device, respectively. The first acceleration sensor 11 and the second acceleration sensor 12 also detect the side-to-side movement and the up-to-down movement of the mobile computer device.

The A/D converters 21, 22 convert the analog signals produced by the first acceleration sensor 11 and the second acceleration sensor 12 into digital signals. In detail, the first A/D converter 21 produces a first gravitational mode signal corresponding to the slant of the side-to-side direction of the mobile computer device, and a first acceleration digital signal corresponding to the side-to-side movement of the mobile computer device. The second A/D converter 22 produces a second gravitational mode signal corresponding to the slant of the up-to-down direction of the mobile computer device, and a second acceleration digital signal corresponding to the up-to-down movement of the mobile computer device.

The first acceleration digital signal is successively integrated by the first integrator 31 and the third integrator 41 to produce a first window-moving mode signal. The second acceleration digital signal is successively integrated by the second integrator 32 and the fourth integrator 42 to produce a second window-moving mode signal.

The screen controller 50 has the function as described previously. Namely, the screen controller 50 receives the first and the second gravitational mode signals or the first and the second window-moving mode signals according to the user's option, and select and display a part of the screen on a display panel 60 from the full screen according to the first and the second gravitational mode signals or the first and the second window-moving mode signals.

Figure 3:
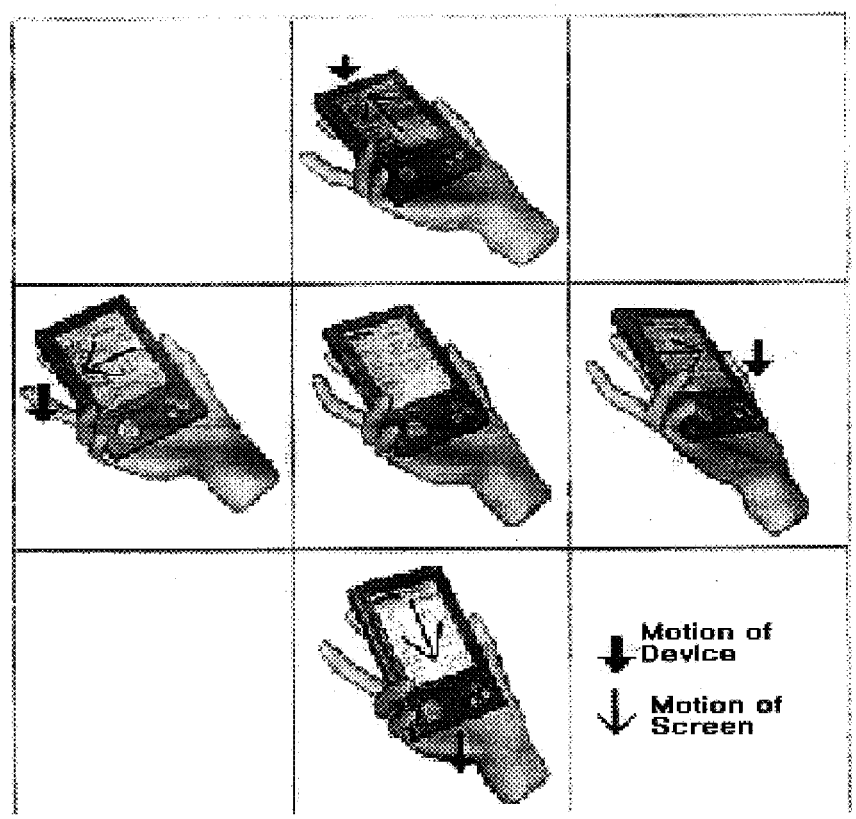
FIG. 3 is a diagram for illustrating the operation of the apparatus working in a gravity mode according to an embodiment of the present invention.
Figure 4:
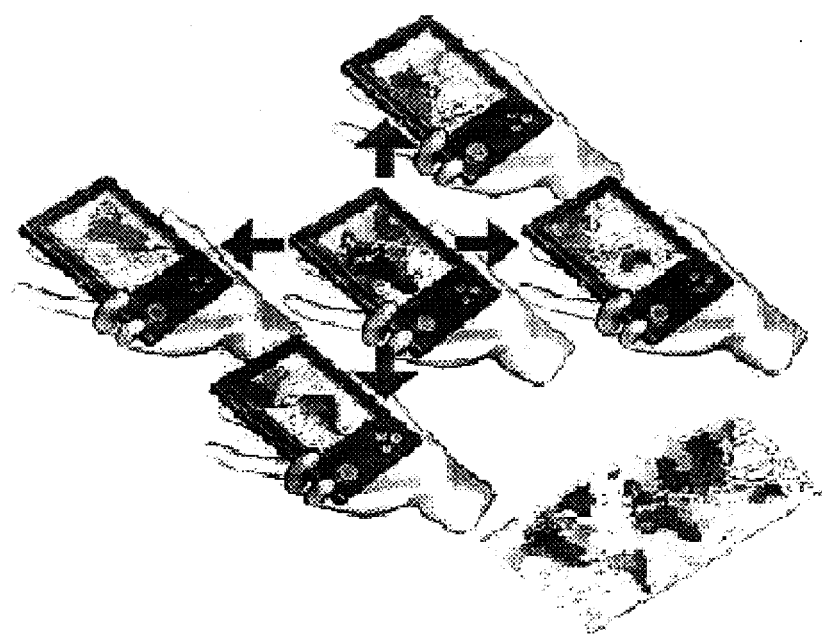
FIG. 4 is a diagram for illustrating the operation of the apparatus working in a window-moving mode according to an embodiment of the present invention.

The operation mode in the apparatus of the present invention can be manually set up by user or automatically set up by a program displaying information. FIGS. 3 and 4 are diagrams for illustrating the operation of the apparatus working in a gravity mode and working in a window-moving mode, respectively. As shown in FIG. 3, when the mobile computer device is not moving, the device can detect the slant of the device, and move the display screen according to the slant. As shown in FIG. 4, when the mobile computer device is moving, the device can detect the moved distance of the device, and move the display screen according to the moved distance. In addition, if text information having large screen size is displayed on the display screen, the operation mode of moving the display screen is automatically switched to the gravitational mode as shown in FIG. 3. If a picture or map having large screen size is displayed on the display screen, the operation mode of moving the display screen is automatically switched to the window-moving mode as shown in FIG. 4. Also, it is preferable that the apparatus according to the present invention further includes a reset switch to display the original first display screen from the moved display screen. The apparatus according to the present invention can be installed within the mobile computer device or can be produced as a separate external device and connected to the mobile computer device with conventional connecting means.

Figure 5:
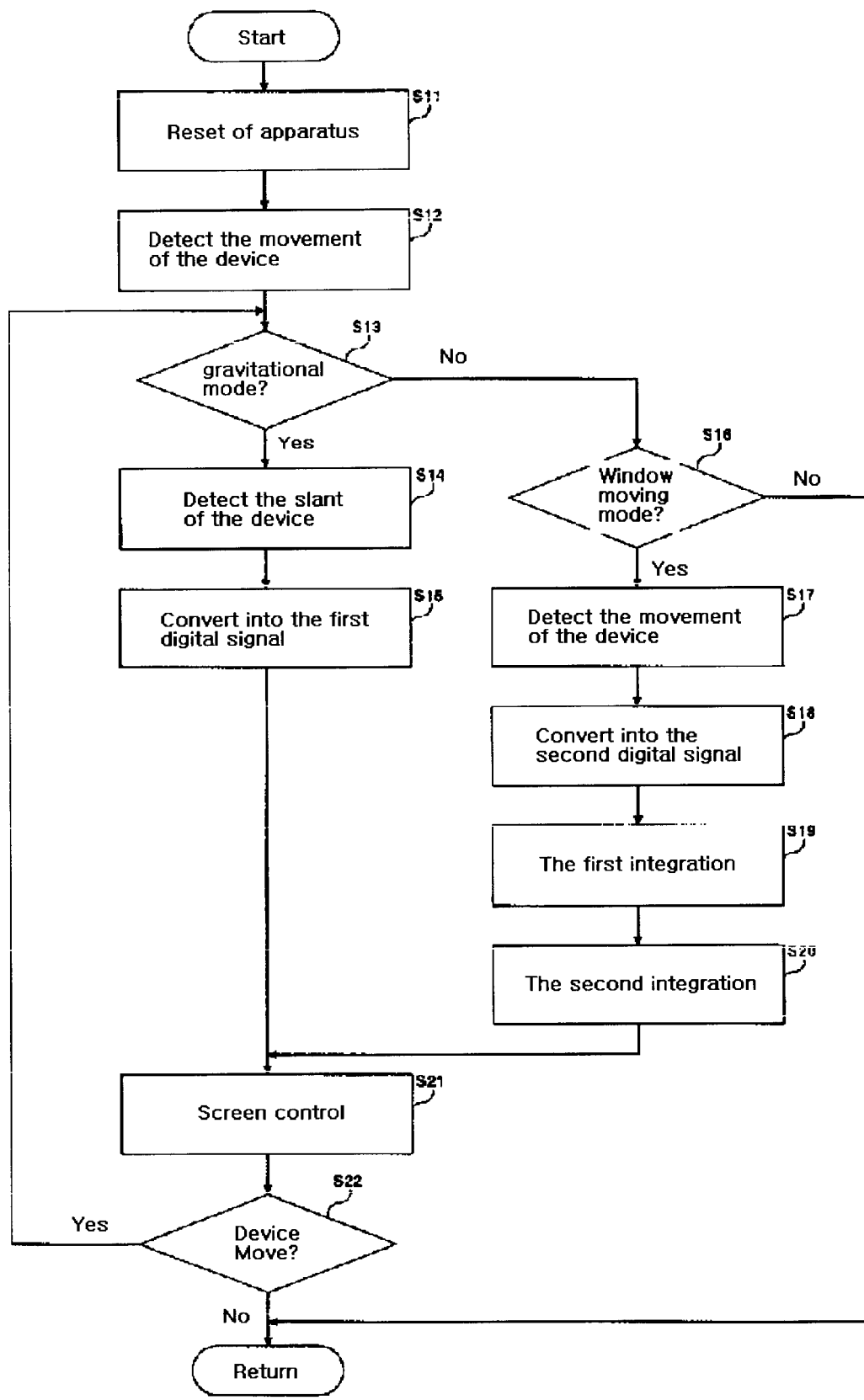
FIG. 5 is a flow chart for illustrating the operation of the apparatus according to an embodiment of the present invention.

The operation of the apparatus according to an embodiment of the present invention will be explained with reference to FIG. 5. First, the apparatus according to the present invention is reset to determine the original position of the display screen (S11). Then the three-dimensional movement of the mobile computer device is detected by the acceleration sensor (S12). Thereafter, if the working mode of the apparatus is the gravitational mode (S13), the slant of the apparatus is detected (S14), and the detected analog signal is converted into the first digital signal by an A/D converter (S15). If the working mode of the apparatus is the window-moving mode (S16), the movements of the apparatus in side-to-side and up-to-down directions are detected (S17), and the detected analog signal is converted into the second digital signal by an A/D converter (S18). The second digital signal is integrated by the first integrator, thereby producing a signal corresponding to the velocity of the mobile computer device (S19), which is in turn integrated by the second integrator to produce a signal corresponding to the moved distance of the mobile computer device (S20). Thereafter, the screen controller produces a second display signal including a part of information (i.e., a part of screen) according to the first or the second digital signals from a first display signal including all information (i.e., full screen) (S21). Then the movement of the mobile computer device is detected (S22). If there is a movement thereof, the operation process is returned to the mode selection step (S13). If there is no movement of the apparatus, the operation is completed.

In case the apparatus for moving a display screen according to the present invention is installed within the mobile computer device, the integration can be carried out by a CPU or a microprocessor provided in the mobile computer device, which reduces the total volume of the apparatus. In case the apparatus for moving a display screen according to the present invention is produced as an external device, the apparatus can be connected to a serial port of the mobile computer device. In this specification, the mobile computer devices include a PDA (Personal Digital Assistance), small portable telecommunication devices including a cellular phone and a PCS (Personal Communication System) and other portable computer devices.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for moving a display screen of a mobile computer device comprising:
   a first acceleration sensor for detecting a side-to-side movement and slant of the mobile computer device in the side-to-side direction;
   a second acceleration sensor for detecting an up-to-down movement and slant of the mobile computer device in the up-to down direction;
   a first A/D converter for converting analog signals produced by the first acceleration sensor into a first gravitational mode signal corresponding to the slant of the side-to-side direction of the mobile computer device and a first acceleration digital signal corresponding to the side-to-side movement of the mobile computer device,
   a second A/D converter for converting analog signals produced by the second acceleration sensor into a second gravitational mode signal corresponding to the slant of the up-to-down direction of the mobile computer device, and a second acceleration digital signal corresponding to the up-to-down movement of the mobile computer device;
   a first integrator and a third integrator for producing a first window-moving mode signal by successively integrating the first acceleration digital signal;
   a second integrator and a fourth integrator for producing a second window-moving mode signal by successively integrating the second acceleration digital signal; and
   a screen controller for receiving a first display signal including all information, and producing a second display signal including a part of information according to the first and the second gravitational mode signals or the first and the second window-moving mode signals.

2. The apparatus for moving a display screen of a mobile computer device according to claim 1, wherein the apparatus for moving a display screen is installed within the mobile computer device.

3. The apparatus for moving a display screen of a mobile computer device according to claim 2, wherein the integrating process is carried out by a CPU or a microprocessor provided in the mobile computer device.

4. The apparatus for moving a display screen of a mobile computer device according to claim 1, wherein the apparatus for moving a display screen is produced as an external device, and the apparatus is connected to the mobile computer device.

* * * * *